Sept. 14, 1937.  T. McALEXANDER  2,093,333
FAN
Filed Jan. 29, 1936  2 Sheets-Sheet 2
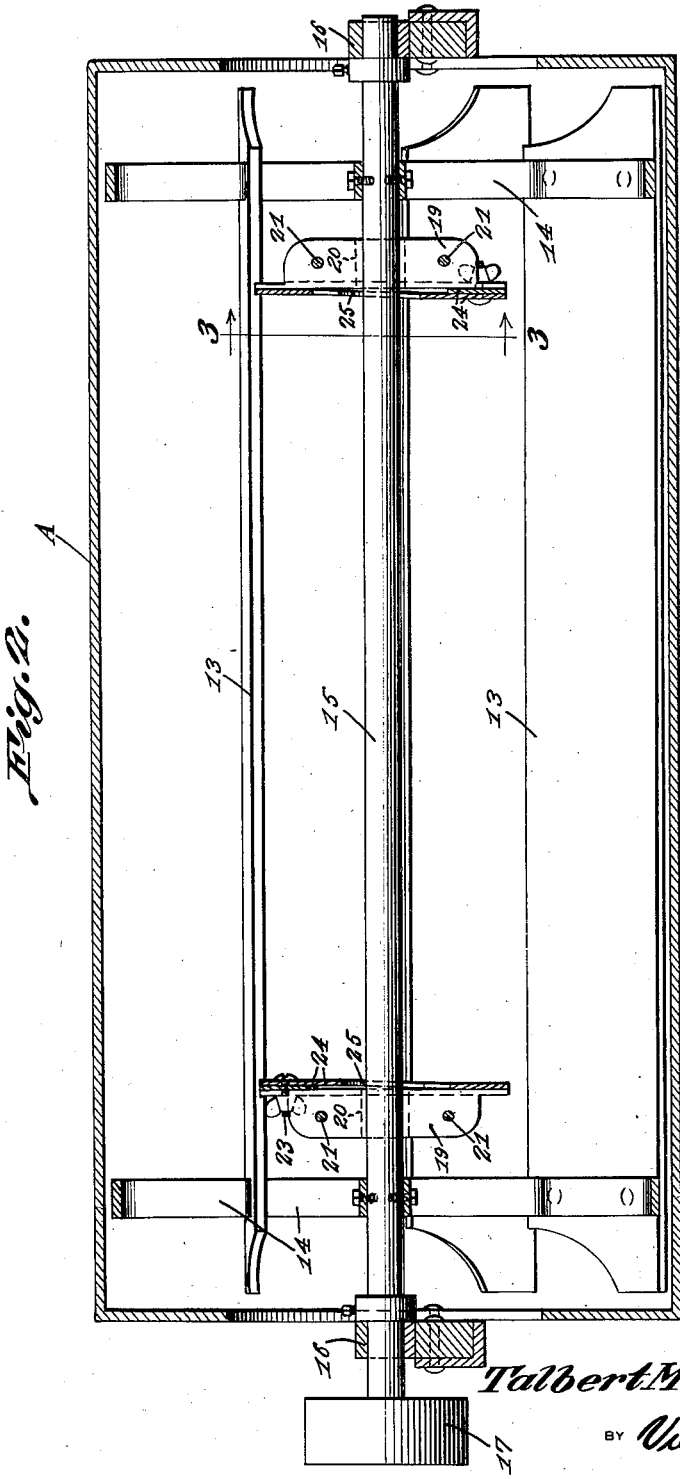
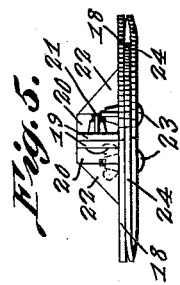
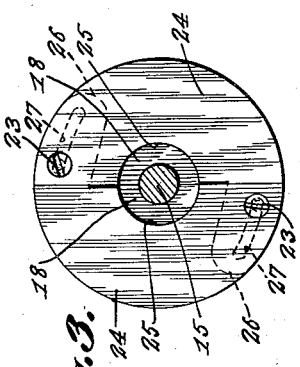
Talbert McAlexander
INVENTOR
BY Victor J. Evans & Co.
ATTORNEY Patented Sept. 14, 1937

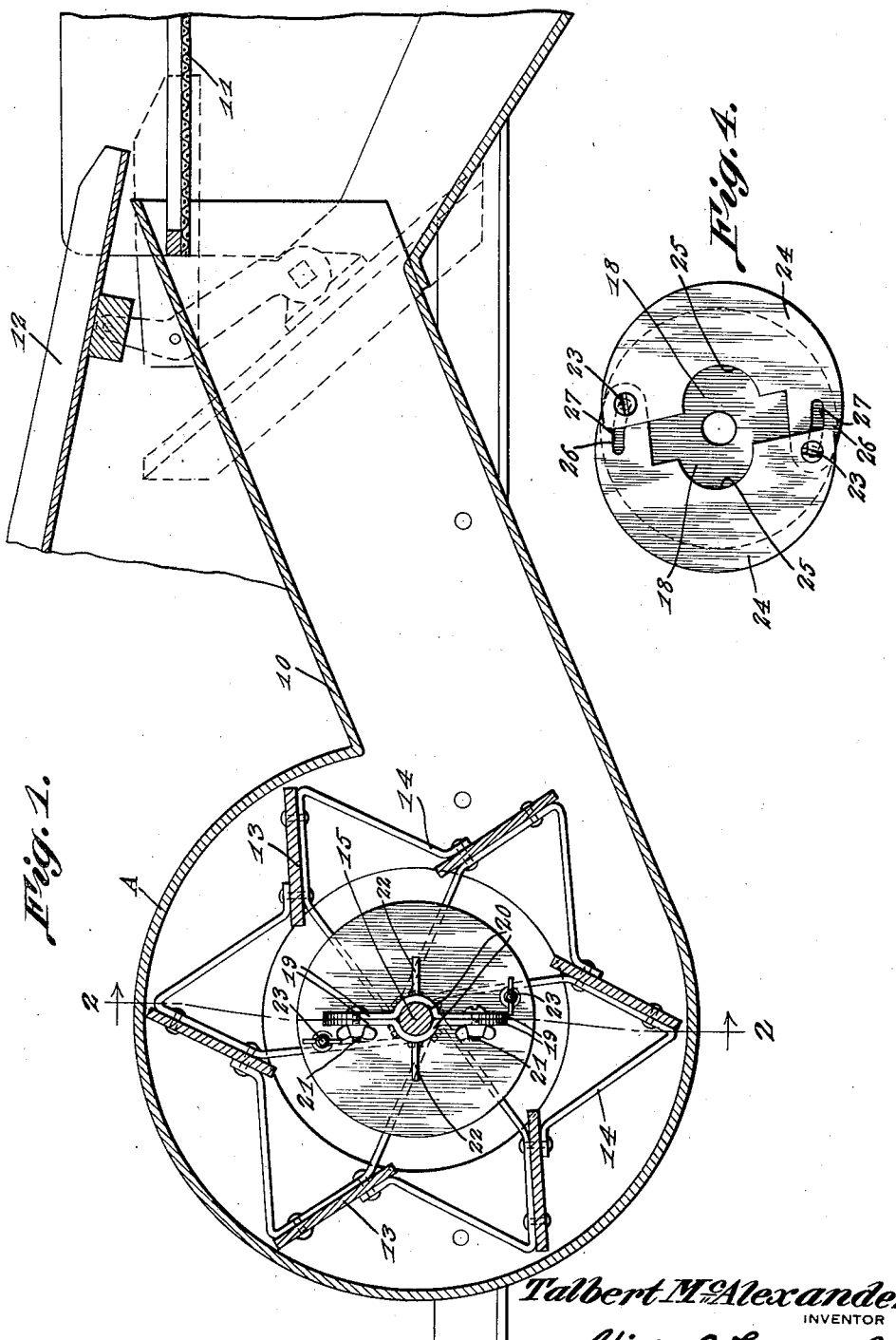

2,093,333

UNITED STATES PATENT OFFICE 2,093,333

FAN

Talbert McAlexander, Earl Park, Ind., assignor of one-half to Mort Nelson, Earl Park, Ind.

Application January 29, 1936, Serial No. 61,405

3 Claims. (Cl. 230—114)

The invention relates to fans and more particularly to draft equalizer attachments for blow fans employed in threshing machines.

The primary object of the invention is the provision of an attachment of this character, wherein the same is employed with that type of fan used for blowing the chaff from the grain on the sieves as built within a grain thresher so that there will be assured an even blast from the fan and thus more efficient separation of the chaff from the grain is attained.

Another object of the invention is the provision of an attachment of this character, wherein an even blast of air is assured during the working of the fan as employed with a threshing machine.

A further object of the invention is the provision of an attachment of this character, which is simple in construction, thoroughly reliable and effective in its purpose, readily and easily adjusted, conveniently mounted upon the axle of the fan, strong, durable, and inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a fragmentary vertical longitudinal sectional view through a grain thresher showing the application of the draft equalizer attachment constructed in accordance with the invention to the blow or blast fan built within the thresher.

Figure 2 is a sectional view on the line 2—2 of Figure 1 looking in the direction of the arrows.

Figure 3 is a sectional view on the line 3—3 of Figure 2 looking in the direction of the arrows.

Figure 4 is a view similar to Figure 3 showing the attachment adjusted.

Figure 5 is a top edge view of the attachment.

Similar reference characters indicate corresponding parts throughout the several views in the drawings.

Referring to the drawings in detail, A designates generally a portion of the casing of a blast or blow fan and having formed therewith is the throat 10 which directs the air blast to the sieve, a portion being indicated at 11, as contained within a grain thresher while a portion of the grain pan being indicated at 12 within the grain thresher.

Within the casing A is located the blower or blast fan including the blades 13, these being carried by strap irons 14 constituting the spokes or arms of the fan and as is usual the air is drawn laterally into the fan casing and is forced outwardly therefrom at the periphery of the fan, these strap irons 14 being fixed to the center axle or shaft 15 which drives the fan and is journaled in bearings 16 suitably fitted at opposite ends of the casing A, the axle 15 exteriorly of the latter being provided with a belt wheel 17 for transmission of power to the axle in the operation of said fan.

The draft equalizer attachment comprises a pair of disks, each formed in two sections 18 of half circular shape, these being provided with right angular wings 19 located at the meeting edges of said sections 18 and such wings provide a center bearing 20 for each disk while passed through the said wings 19 are winged nut carrying bolts 21 so that the sections 18 can be made secure with each other and the bearing 20 clamped about the axle 15. The bearing 20 is strengthened by reinforcing ribs 22 disposed diametrically opposite and integral with the sections 18 as well as with the bearing 20.

Reversely pivoted to the sections 18 of the disk by bolts 23 next to the meeting edges of said sections are swinging half circular shaped shutters 24, these centrally being provided with half circular notches 25 which are adapted for matching relation to each other to afford a clearance for the axle 15 when the disk including the sections 18 is carried by said axle, there being two disks involved in the draft equalizer.

The shutters are formed with extension ears 26, these having arcuate slots 27 for accommodating the bolts 23 so that in this manner the said shutters 24 can be adjusted as is clearly apparent from Figure 4 of the drawings, the said shutters being adapted to be spread as is present in this view.

The disks including the sections 18 are fitted to the axle 15 to be worn thereby in spaced relation to each other as is present in Figure 2 of the drawings so that the incoming air entering the casing of the fan will be caused to flow between the disks of the attachment whereby the currents will be centrally of the bladed fan wheel and forced outwardly therefrom between the blades and thus evenly blasted to the entire area of the sieve 11 rather than a center blast by the inflowing of the air through opposite ends of said fan casing A, the air currents being forced from the center out into the blades 13 of the fan thus giving a more even blast throughout the entire cleaning. The shutter arrangement of the attachment allows adjustment thereof in conformity with the different diameters of fans as may be installed within threshers.

What is claimed is:

1. The combination with a bladed fan having a central axle, of an attachment comprising a pair of two-part disks located within the fan inwardly of the ends of its blades and provided with wings, means clamping the wings for the adjustable fastening of the two parts of said disks about the axle, a casing for the fan and having the axle journaled centrally thereof and reversely pivoted half circular shaped shutters carried by the two parts of said disks.

2. The combination with a bladed fan having a central axle, of an attachment comprising a pair of two-part disks located within the fan inwardly of the ends of its blades and provided with wings, means clamping the wings for the adjustable fastening of the two parts of said disks about the axle, a casing for the fan and having the axle journaled centrally thereof, reversely pivoted half circular shaped shutters carried by the two parts of said disks, and means fastening the reversely pivoted shutters for holding the same in adjusted relation to each other.

3. The combination with a bladed fan having a central axle, of an attachment comprising a pair of two-part disks located within the fan inwardly of the ends of its blades and provided with wings, means clamping the wings for the adjustable fastening of the two parts of said disks about the axle, a casing for the fan and having the axle journaled centrally thereof, reversely pivoted half circular shaped shutters carried by the two parts of said disks, and means fastening the reversely pivoted shutters for holding the same in adjusted relation to each other, the blades of the said fan being concentrically positioned about the two-part disk when clamped on the axle.

TALBERT McALEXANDER.